(12) United States Patent
Saitoh

(10) Patent No.: US 7,716,439 B2
(45) Date of Patent: May 11, 2010

(54) DATA PROCESSING SYSTEM AND METHOD WITH COPY PROTECTION

(75) Inventor: Masayuki Saitoh, Matsumoto (JP)

(73) Assignee: Roland Corporation, Hamamatsu (JP)

( * ) Notice: Subject to any disclaimer, the term of this patent is extended or adjusted under 35 U.S.C. 154(b) by 1147 days.

(21) Appl. No.: 11/031,991

(22) Filed: Jan. 7, 2005

(65) Prior Publication Data

US 2006/0156411 A1 Jul. 13, 2006

(51) Int. Cl.
*G06F 13/14* (2006.01)

(52) U.S. Cl. ....................................................... 711/163
(58) Field of Classification Search ................... 711/163
See application file for complete search history.

(56) References Cited

U.S. PATENT DOCUMENTS

| | | | |
|---|---|---|---|
| 4,866,769 A | | 9/1989 | Karp |
| 4,903,296 A | | 2/1990 | Chandra et al. |
| 5,933,497 A | | 8/1999 | Beetcher et al. |
| 6,243,796 B1 * | | 6/2001 | Otsuka ........................ 711/163 |
| 6,367,019 B1 | | 4/2002 | Ansell et al. |
| 6,397,333 B1 | | 5/2002 | Sohne et al. |
| 6,442,626 B1 | | 8/2002 | Smola et al. |
| 6,512,836 B1 * | | 1/2003 | Xie et al. ..................... 382/100 |
| 6,681,212 B1 | | 1/2004 | Zeng |
| 6,684,199 B1 | | 1/2004 | Stebbings |
| 7,010,686 B2 * | | 3/2006 | Thoone et al. ............... 713/165 |
| 2001/0046298 A1 * | | 11/2001 | Terada et al. ................. 380/252 |
| 2002/0080960 A1 | | 6/2002 | Kanayama et al. |
| 2002/0112172 A1 | | 8/2002 | Simmons |
| 2002/0147922 A1 | | 10/2002 | Hartinger et al. |
| 2002/0194492 A1 | | 12/2002 | Choi et al. |
| 2003/0221103 A1 * | | 11/2003 | Hirota et al. ................. 713/172 |
| 2003/0221113 A1 | | 11/2003 | Kupka et al. |
| 2004/0010685 A1 | | 1/2004 | Sakaguchi et al. |
| 2004/0236917 A1 * | | 11/2004 | Miyahara et al. ............ 711/163 |
| 2006/0265560 A1 * | | 11/2006 | Geerlings .................... 711/163 |

FOREIGN PATENT DOCUMENTS

| | | |
|---|---|---|
| JP | 2002-032141 | 1/2002 |
| JP | 2003-005855 | 1/2003 |

\* cited by examiner

*Primary Examiner*—Stephen C Elmore
*Assistant Examiner*—Shawn Eland
(74) *Attorney, Agent, or Firm*—Foley & Lardner LLP

(57) ABSTRACT

A data processing system includes a readout unit, a device ID storage unit, a storage medium writing unit, a determination unit, and a processing unit. The readout unit reads out data that have been stored on a storage medium, where the storage medium is removably mounted in an external storage unit. The device ID storage unit stores a device ID that is peculiar to a device. The storage medium writing unit writes the device ID that has been stored in the device ID storage unit to the storage medium. The determination unit makes a determination as to whether the device ID that has been written to the storage medium and the device ID that has been stored in the device ID storage unit are in agreement. The processing unit carries out either first processing or second processing depending on a determination made by the determination unit.

42 Claims, 8 Drawing Sheets

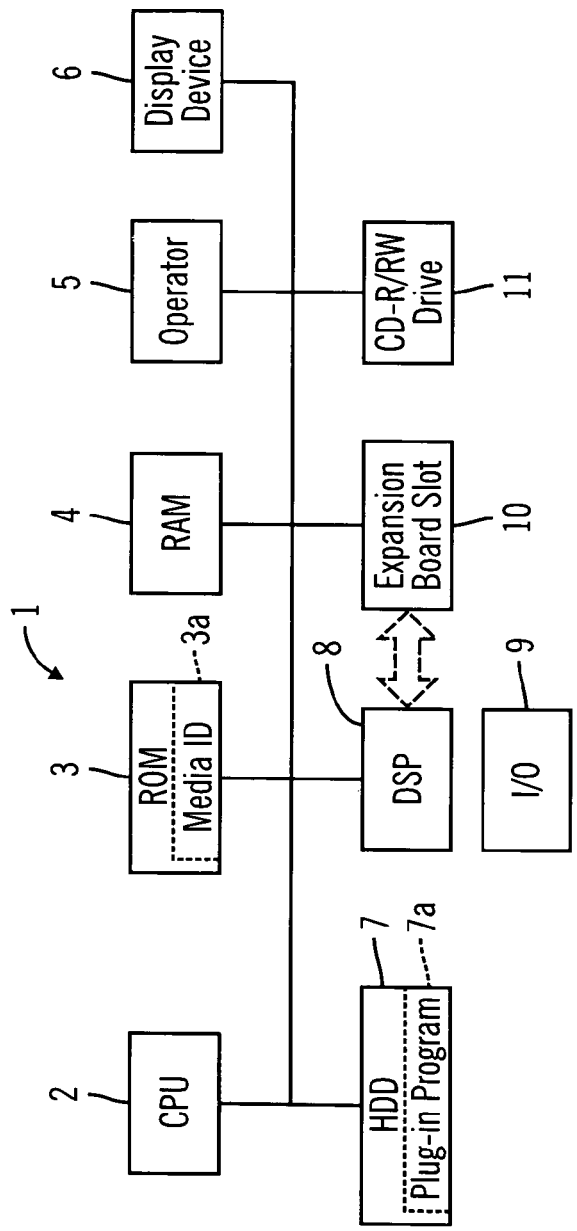
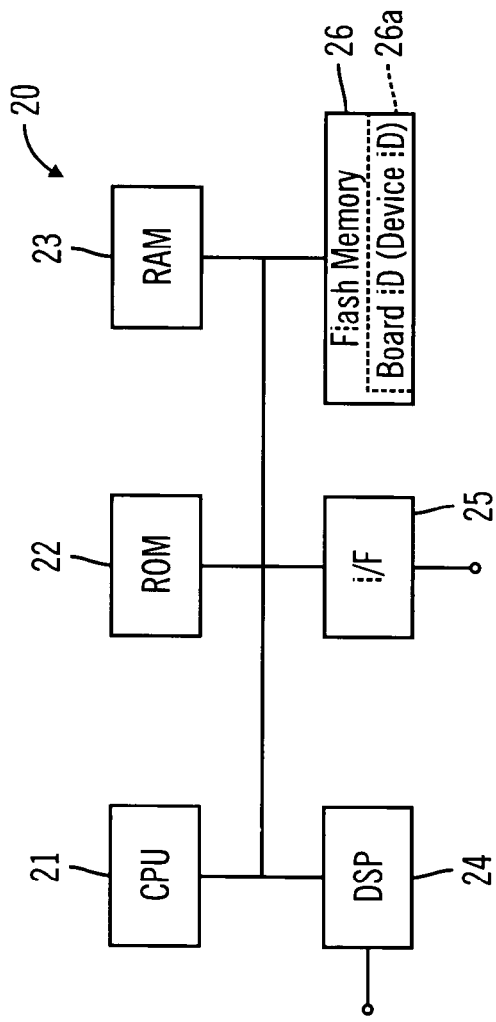
FIG. 1A
FIG. 1B

DATA PROCESSING SYSTEM AND METHOD WITH COPY PROTECTION

BACKGROUND OF THE INVENTION

1. Field of the Invention

Embodiments of the present invention relate to a data processing system and method and, in particular embodiments, to a data processing system and method with which it is possible to prevent programs or data from being used illegally.

2. Related Art

In the past, the storage media on which programs and data have been stored were mounted in a data processing system, the programs and data were read out, stored on a hard disk and the like, and utilized. Those programs and data were ones that added capabilities to the data processing system or improved the capabilities of the data processing system.

However, there have been problems in that the storage media on which the programs and data have been stored could be obtained by borrowing the media from another person and the like and illegally copying the programs and data to the hard disk of the data processing system and utilizing them. In other words, there are copyrights for programs and data, and only those who have legally obtained the programs and data by purchasing them and the like may legally use them. Borrowing the programs and data from other people and copying them is unlawful, but, in actuality, they are used illegally.

Therefore, in an attempt to prevent illegal use, restrictions with respect to use have been added, but the restrictions have caused the programs and data to become substandard with regard to convenience of use.

SUMMARY OF THE DISCLOSURE

Embodiments of the present invention address problems as discussed above and relate to a data processing system and method that is satisfactory with regard to convenience of use together with being able to prevent illegal utilization.

A data processing system in accordance with a first embodiment is, in a data processing system that is furnished with readout means that reads out the data that have been stored on a storage medium, which is removably mounted, in external storage means, furnished with device ID storage means that stores a device ID that is peculiar to the device, and storage medium writing means that writes the device ID that has been stored in the device ID storage means to the storage medium, and first determination means that makes a determination as to whether the device ID that has been written to the storage medium and the device ID that has been stored in the device ID storage means are in agreement, and processing means that carries out the first processing that is based on the data that have been read out by the readout means in those cases where it has been determined by the first determination means that the device ID that has been written to the storage medium and the device ID that has been stored in the device ID storage means are in agreement, and that carries out the second processing, which differs from the first processing, in those cases where it has been determined by the first determination means that the device ID that has been written to the storage medium and the device ID that has been stored in the device ID storage means are not in agreement. The "data" include programs and data that are utilized by devices such as the values of parameters and the like.

A data processing system in accordance with a second embodiment is, for a data processing system of the first embodiment, one in which the storage medium is one that stores the data, and a media ID that specifies the storage medium and which it is not possible to copy, and the system is furnished with media ID storage means that stores the media ID that is stored on the storage medium, and second determination means that makes a determination as to whether the media ID that is stored by the media ID storage means and the media ID that is stored on the storage medium are in agreement, and the processing means carries out the first processing that is based on the data that have been stored in the storage means in those cases where it has been determined by the second determination means that the media ID that has been stored by the media ID storage means and the media ID that has been stored to the storage medium are in agreement, and that carries out the second processing, which differs from the first processing, in those cases where it has been determined by the second determination means that the media ID that has been stored by the media ID storage means and the media ID that has been stored to the storage medium are not in agreement.

A data processing system in accordance with a third embodiment is, for a data processing system of the first embodiment, one that has encoding means that encodes the device ID that has been stored in the device ID storage means, and decoding means that decodes the device ID that has been encoded by the encoding means, and the storage medium writing means is one in which the device ID that has been encoded by the encoding means is written to the storage medium, and the first determination means is one in which a determination is made as to whether the device ID that has been written to the storage medium, which has been decoded by the decoding means, and the device ID that has been stored in the device ID storage means are in agreement.

A data processing system in accordance with a fourth embodiment is, for a data processing system of the third embodiment, one that is furnished with processing information storage means that stores the data and the device ID, and processing information writing means in which the data that have been read out from the storage medium by the readout means and the device ID that has been encoded by the encoding means are written to the processing information storage means, and the processing means carries out the processing based on the data that have been stored in the information storage means.

A data processing system in accordance with a fifth embodiment is, for a data processing system of the first embodiment, furnished with mountable expansion board mounting means in which an expansion board that is furnished with data processing means, with which data processing that is based on the device ID storage means and the data that have been read out from the storage medium by the readout means is carried out, is free to be mounted and removed.

A data processing system in accordance with a sixth embodiment is, for a data processing system of the fifth embodiment, one in which the data processing means is furnished with musical tone processing means that processes a musical tone signal and the musical tone processing is carried out by the musical tone processing means based on the data that have been read out by the readout means.

A data processing system in accordance with a seventh embodiment is, for a data processing system of the first embodiment, one in which the device ID storage means is configured by a non-volatile writable memory, and the system is furnished with device ID generation means that generates the device ID, and device ID writing means in which the device ID that has been generated by the device ID generating means is written to the device ID storage means.

A data processing system in accordance with an eighth embodiment is, for a data processing system of the first embodiment, furnished with musical tone processing means that processes a musical tone signal, and in those cases where a determination has been made by the first determination means that the device ID that has been written to the storage medium and the device ID that has been stored in the device ID storage means are in agreement, the first musical tone processing is carried out by the musical tone processing means based on the data that have been read out by the readout means, and in those cases where a determination has been made by the first determination means that the device ID that has been written to the storage medium and the device ID that has been stored in the device ID storage means are not in agreement, the second musical tone processing, which is different from the first musical tone processing, is carried out by the musical tone processing means.

A data processing system in accordance with a ninth embodiment is furnished with device ID storage means that stores a device ID that is peculiar to the device, and processing information storage means that stores the data and the device ID, and determination means with which a determination is made as to whether the device ID that has been stored in the processing information storage means and the device ID that has been stored in the device ID storage means are in agreement, and processing means that carries out the first processing based on the data that have been stored in the processing information storage means in those cases where a determination has been made by the determination means that the device ID that has been stored in the processing information storage means and the device ID that has been stored in the device ID storage means are in agreement, and carries out the second processing, which is different from the first processing, in those cases where a determination has been made by the determination means that the device ID that has been stored in the processing information storage means and the device ID that has been stored in the device ID storage means are not in agreement.

A data processing system in accordance with a tenth embodiment is, for a data processing system of the ninth embodiment, one that has encoding means that encodes the device ID that has been stored in the device ID storage means, and decoding means that decodes the device ID that has been encoded by the encoding means, and the processing information storage means is one in which the data and the device ID that has been encoded by the encoding means are stored, and the determination means is one in which a determination is made as to whether the device ID that has been stored in the processing information storage means, which has been decoded by the decoding means, and the device ID that has been stored in the device ID storage means are in agreement.

A data processing system in accordance with an eleventh embodiment is, for a data processing system of the ninth embodiment, furnished with mountable expansion board mounting means in which an expansion board that is furnished with data processing means, with which data processing that is based on the data that have been stored in the processing information storage means is carried out, is free to be mounted and removed.

A data processing system in accordance with a twelfth embodiment is, for a data processing system of the eleventh embodiment, one in which the data processing means is furnished with musical tone processing means that processes a musical tone signal and the musical tone processing is carried out by the musical tone processing means based on the data that have been stored in the processing information storage means.

A data processing system in accordance with a thirteenth embodiment is, for a data processing system of the ninth embodiment, one in which the device ID storage means is configured by a non-volatile writable memory, and the system is furnished with device ID generation means that generates the device ID, and device ID writing means in which the device ID that has been generated by the device ID generation means is written to the device ID storage means.

A data processing system in accordance with a fourteenth embodiment is, for a data processing system of the ninth embodiment, one in which the processing means is furnished with musical tone processing means that processes a musical tone signal, and in those cases where a determination has been made by the determination means that the device ID that has been stored in the processing information storage means and the device ID that has been stored in the device ID storage means are in agreement, the first musical tone processing is carried out by the musical tone processing means based on the data that have been stored in the processing information storage means, and in those cases where a determination has been made by the determination means that the device ID that has been stored in the processing information storage means and the device ID that has been stored in the device ID storage means are not in agreement, the second musical tone processing, which is different from the first musical tone processing, is carried out by the musical tone processing means.

In accordance with a data processing system of the first embodiment, the device ID storage means stores a device ID that is peculiar to the device, and by means of the storage medium writing means, the device ID that has been stored in the device ID storage means is written to the storage medium. The processing means carries out the first processing in those cases where a determination has been made by the first determination means that the device ID that has been written to the storage medium and the device ID that has been stored in the device ID storage means are in agreement and carries out the second processing, which is different from the first processing, in those cases where a determination has been made that they are not in agreement. Accordingly, there is the advantageous result that it is possible to prevent the illegal use of the storage medium by a data processing system that has a different device ID due to the fact that the second processing carries out processing that is not normal. In addition, with the second processing, if processing is carried out that is not normal and has had some controls established, it is possible to use the data that have been stored on the storage medium for trial testing.

In accordance with a data processing system of the second embodiment, in addition to the advantageous result that is exhibited by a data processing system of the first embodiment, the storage medium is one that stores the data and a media ID that specifies the storage medium and that cannot be copied. The media ID storage means stores the media ID that is stored on the storage medium, the second determination means makes a determination as to whether media ID that the media ID storage means has stored and the media ID that is stored on the storage medium are in agreement, and the processing means carries out the first processing based on the data that are stored on the storage medium in those cases where a determination has been made by the second determination means that they are in agreement and carries out the second processing, which is different from the first processing, in those cases where a determination has been made that they are not in agreement. Therefore, there is the advantageous result that due to the fact that the second processing is done and processing that is not normal is carried out, it is possible to prevent use of a storage medium that has been copied illegally.

In accordance with a data processing system of the third embodiment, in addition to the advantageous result that is exhibited by a data processing system of the first embodiment, the system has encoding means with which the device ID that has been stored in the device ID storage means is encoded and decoding means with which the device ID that has been encoded by the encoding means is decoded, and the storage medium writing means is one that writes the device ID that has been encoded by the encoding means to the storage medium. Since the first determination means makes a determination as to whether the device ID that has been written to the storage medium, which has been decoded by the decoding means, and the device ID that has been stored in the device ID storage means are in agreement, there is the advantageous result that it is possible to prevent the device ID that has been stored on the storage medium from being deciphered by a third party and copied.

In accordance with a data processing system of the fourth embodiment, in addition to the advantageous result that is exhibited by a data processing system of the third embodiment, the system is furnished with processing information storage means that stores the data and the device ID and processing information writing means that writes the data that have been read out from the storage medium by the readout means and the device ID that has been encoded by the encoding means to the processing information storage means. Since, because the processing means carries out the processing based on the data that have been stored in the processing information storage means, it is possible to carry out the processing even if there is no storage medium, the convenience of use is satisfactory and, together with this, since the data and the device ID are encoded, it is possible to prevent illegal use such as deciphering the device ID and rewriting it and the like.

In accordance with a data processing system of the fifth or sixth embodiments, in addition to the advantageous result that is exhibited by a data processing system of the first embodiment, since the system is furnished with mountable expansion board mounting means in which an expansion board that is furnished with data processing means, with which data processing that is based on the device ID storage means and the data that have been read out from the storage medium by the readout means is carried out, and that is free to be mounted and removed, even if it is a different data processing system, it is possible to mount the expansion board and the storage medium on which the device ID that has been stored on the expansion board is stored and carry out normal processing. Therefore, there is the advantageous result that the convenience of use is satisfactory together with it being possible to prevent illegal use.

In accordance with a data processing system of the seventh embodiment, in addition to the advantageous result that is exhibited by a data processing system of the fifth embodiment, since the device ID storage means is configured by non-volatile writable memory and the system is furnished with device ID generation means that generates the device ID and device ID writing means writes the device ID that has been generated by the device ID generating means to the device ID storage means, there is the advantageous result that, because it is not necessary to set a device ID for each device in advance, it is possible to reduce the cost of manufacturing the device.

In accordance with a data processing system of the eighth embodiment, in addition to the advantageous result that is exhibited by a data processing system of the first embodiment, since the processing means is furnished with musical tone processing means that processes a musical tone signal and, in those cases where a determination has been made by the first determination means that the device ID that has been written to the storage medium and the device ID that has been stored in the device ID storage means are in agreement, carries out the first musical tone processing by means of the musical tone processing means based on the data that have been read out by the readout means, while in those cases where a determination has been made by the first determination means that the device ID that has been written to the storage medium and the device ID that has been stored in the device ID storage means are not in agreement, the second musical tone processing, which is different from the first musical tone processing, is carried out by the musical tone processing means, by carrying out processing in which noise is inserted into the musical tone and the like as the second musical tone processing, it is possible to establish restrictions in those cases where there has been illegal use or in those cases where there is trial use for testing.

In accordance with a data processing system of the ninth embodiment, a device ID that is peculiar to the device is stored in the device ID storage means, the data and the device ID are stored in the processing information storage means, and the determination means makes a determination as to whether the device ID that has been stored in the processing information storage means and the device ID that has been stored in the device ID storage means are in agreement. The processing means, in those cases where a determination has been made by the determination means that the device ID that has been stored in the processing information storage means and the device ID that has been stored in the device ID storage means are in agreement, carries out the first processing based on the data that have been stored in the processing information storage means and the in those cases where a determination has been made by the determination means that the device ID that has been stored in the processing information storage means and the device ID that has been stored in the device ID storage means are not in agreement, caries out the second processing, which is different from the first processing. Accordingly, even in those cases where the data and the device ID that have been stored in the processing information means have been copied illegally, it is possible to prevent illegal use by setting the second processing so that it is not normal processing.

In accordance with a data processing system of the tenth embodiment, in addition to the advantageous result that is exhibited by a data processing system of the ninth embodiment, the system has encoding means with which the device ID that has been stored in the device ID storage means is encoded and decoding means with which the device ID that has been encoded by the encoding means is decoded, and the processing information storage means stores the data and the device ID that has been encoded by the encoding means. Therefore, there is the advantageous result that it is possible to prevent the data and the device ID that have been encoded from being illegally duplicated and used.

In accordance with a data processing system of the eleventh or twelfth embodiment, in addition to the advantageous result that is exhibited by a data processing system of the ninth embodiment, since the system is furnished with mountable expansion board mounting means in which an expansion board that is furnished with data processing means, with which data processing that is based on the device ID storage means and the data that have been stored in the processing information storage means is carried out, is free to be mounted and removed, even if it is a different data processing system, it is possible to mount the expansion board and by copying from the information storage means with which the device ID that has been stored on the expansion board is stored, carry out normal processing.

In accordance with a data processing system of the thirteenth embodiment, in addition to the advantageous result that is exhibited by a data processing system of the ninth embodiment, since the device ID storage means is configured by non-volatile writable memory and the system is furnished with device ID generation means that generates the device ID and device ID writing means writes the device ID that has been generated by the device ID generating means to the device ID storage means, there is the advantageous result that, because it is not necessary to set a device ID for each device in advance, it is possible to reduce the cost of manufacturing the device.

In accordance with a data processing system of the fourteenth embodiment, in addition to the advantageous result that is exhibited by a data processing system of the ninth embodiment, since the processing means is furnished with musical tone processing means that processes a musical tone signal and carries out the first musical tone processing by means of the musical tone processing means based on the data that have been stored in the processing information storage means in those cases where a determination has been made by the determination means that the device ID that has been stored in the processing information storage means and the device ID that has been stored in the device ID storage means are in agreement, and carries out the second musical tone processing by means of the musical tone processing means, which differs from the first musical tone processing, in those cases where a determination has been made by the determination means that the device ID that has been stored in the processing information storage means and the device ID that has been stored in the device ID storage means are not in agreement, by carrying out processing in which noise is inserted into the musical tone and the like as the second musical tone processing, it is possible to establish restrictions in those cases where there is illegal use or in those cases where the use is for trial testing.

BRIEF DESCRIPTION OF THE DRAWINGS

FIG. 1(a) is a block diagram that shows an electrical configuration of a data processing system of an embodiment of the present invention, and FIG. 1(b) is a block diagram that shows an electrical configuration of an expansion board to be used in a data processing system of an embodiment of the invention;

FIGS. 3(a) and 3(b) are drawings that show an effect setting screen for selecting effects, wherein FIG. 3(a) is a drawing that shows a state in which settings of states of six effects are displayed, and FIG. 3(b) is a drawing that shows a condition in which settings of effect 3 of FIG. 3(a) have been changed;

DETAILED DESCRIPTION OF PREFERRED EMBODIMENTS

Figure 2:
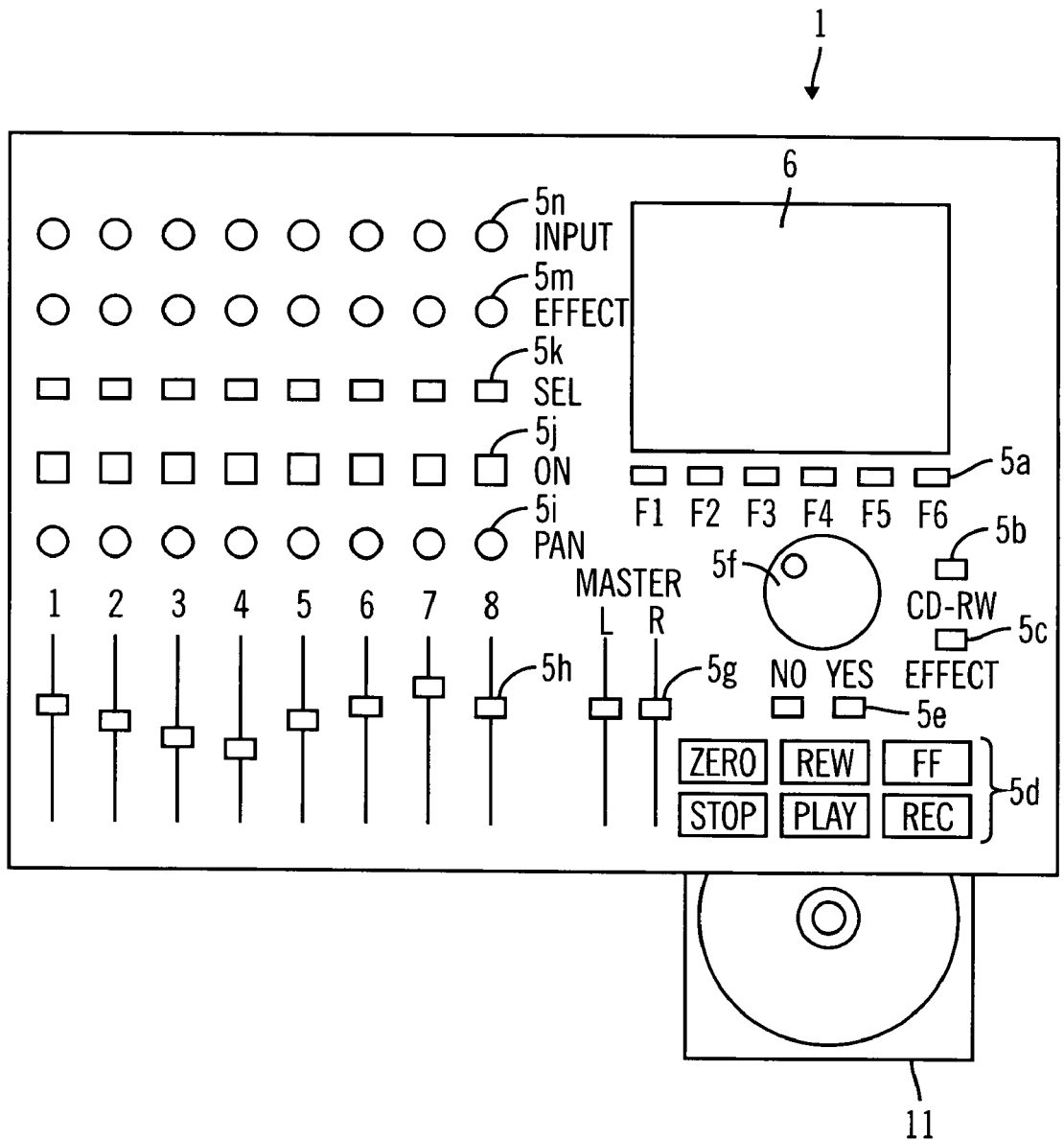
FIG. 2 is a plane drawing that shows an operating panel of a data processing system of an embodiment of the invention.

Explanations will be given below regarding embodiments of the present invention while referring to the attached drawings. FIG. 1(a) is a block diagram that shows an electrical configuration of a data processing system 1 in accordance with an embodiment of the present invention. FIG. 1(b) is a block diagram that shows an electrical configuration of an expansion board 20 that can be mounted in the data processing system 1 such that the board is free to be mounted and removed.

The data processing system 1 is a system that processes sounds that have been input from a plurality of channels and adjusts the levels or applies effects for each of the channels. These are synthesized, mixed into the sound signals of two stereo channels, and recorded. The sounds that are recorded are stored on a hard disk and when finally completed, are stored to a CD-R and the like.

The expansion board 20 increases the number of functions that the data processing system 1 can use to apply effects. The effect processing that is carried out by the expansion board 20 is done by executing plug-in programs that are supplied by means of a CD-R.

The data processing system 1, as is shown in FIG. 1(a), is furnished with a CPU 2, a ROM 3, a RAM 4, operators 5, a display device 6, a hard disk 7, a DSP 8, an input and output system (I/O) 9, an expansion board slot 10, and a CD-R/RW drive. The operators 5 are operated by the user. The display device 6 displays each of the various settings, conditions, and the like. The DSP 8 is a signal processing system. The input and output system (I/O) 9 is connected to the DSP 8.

The CPU 2 is a central processing unit that executes each of the various processes in accordance with the control programs that are stored in the ROM 3 and on the hard disk 7. The ROM 3 stores the basic programs that are executed by the CPU 2 and the fixed value data. The media ID 3a is stored as one of the fixed value data.

A media ID that specifies the variety of CD-R is stored on a CD-R or CD-RW (a CD-R is a CD that can be written to, but rewriting is not possible, and a CD-RW is a CD that can be rewritten; hereinafter, these writable media will be referred to simply as "CD-R") and this media ID is an ID that cannot be copied to another CD-R. Accordingly, by deciding in advance on an original media ID that is written to the CD-R and deciphering the media ID that is stored on the CD-R, it is possible to determine whether the CD-R has been copied illegally or is a legitimate one. The original media ID 3a is stored in the ROM 3.

The RAM 4 temporarily stores each of the diverse variables for the execution of the control programs by the CPU 2. In addition, when the application programs that are stored on the hard disk 7 are executed, the programs are transferred to the RAM 4 and executed.

The operators 5 are each of the various types of switches and volume controls with which the operating panel of the data processing system 1 is furnished, and will be discussed later while referring to FIG. 2. The display device 6 is configured by a liquid crystal display (LCD) and displays each of the various processing settings and parameter settings. It is possible to change and select the settings by means of the operators 5.

The hard disk 7 is a non-volatile large storage capacity memory. The data for the musical tones that have been recorded and edited and programs and data that have been stored on the CD-Rs, which have been mounted in the CD drive 11, are installed on the hard disk 7. As one of the programs and data, there is the plug-in program and data for the control of the expansion board 20 that is mounted in the expansion slot 10.

When the plug-in program is installed, a device ID (that will be discussed later) is appended to the plug-in program, encoded, and stored.

The DSP 8 is a digital signal processor, which is a microprocessor for the processing of sound signals. The DSP 8 carries out processing such as imparting an audio effect to the sound and the like in accordance with the programs and data that are stored in a RAM that is built into the DSP. The DSP 8 has a ROM (not shown in the drawing) in which noise waveforms are stored. The DSP 8 has the function of reading out the noise waveforms that have been stored in the ROM and adding noise to the sound that is input in conformance with the instruction of the CPU 2.

In addition, the input and output system (I/O) 9 is connected to the DSP 8. The input and output system (I/O) 9 is furnished with an A/D converter, a D/A converter, and an interface. The A/D converter converts the sound of an analog signal that is input from outside to a digital signal. The D/A converter converts the digital signal that has been processed internally to an analog signal when the signal is output to the outside. The interface allows for digital signals or analog signals to be received from and transmitted to other devices.

The expansion board slot 10 is a slot in which the expansion board 20 can be mounted so that the board is free to be mounted and removed. The expansion board slot 10 is furnished with a connector that is connected to the bus that is connected to the CPU 2, and a connector that is connected to the bus for transmitting and receiving the sound signals to and from the DSP 8. The sound signal processing ability by only the DSP 8 that is built into the data processing system 1 is limited. In those cases where there is a need to carry out the processing of a great variety of sound signals, an expansion board 20 is mounted in the expansion slot 10. In a preferred embodiment, it is possible to mount four expansion boards 20.

The CD drive 11, together with being able to mount CD-Rs so that they are free to be mounted and removed and reading out the programs and data that are stored on the CD-R, is a device with which programs and the like can be written. In a preferred embodiment, the programs for the sound signal processing that are executed by the DSP 8 as well as the data and sound signals that are required at the time of program execution are stored on the CD-R, and the readout and writing of this information is carried out by the CD drive 11.

FIG. 1(b) is a block diagram that shows an electrical configuration of the expansion board 20 that is mounted in the expansion board slot 10 described above. The expansion board 20 is configured by a CPU 21, a ROM 22, a RAM 23, a DSP 24, an interface (I/F) 25, and a flash memory 26.

The CPU 21 is a central processing unit that executes each of the various processes in accordance with a control program that is stored in the ROM 22. The ROM 22 stores the control programs that are executed by the CPU 21 and the fixed value data. The RAM 23 is a memory in which each of the various types of data for the execution of the control programs by the CPU 21 are stored temporarily.

The DSP 24 is the same as the DSP 8 discussed above and is used to impart effects to the sound that are different from those of the DSP 8. The interface 25 communicates with the data processing system 1. The programs in which the algorithms are stored for the signal processing that is executed by the DSP 24 as well as the data, such as the parameters that are used in the processing, are transmitted to the RAM of the DSP 24 via the interface 25.

The flash memory 26 is a non-volatile writable memory. The board ID 26a (the device ID) is stored in the flash memory 26. The board ID 26a is required to be different for each board, but at the time of shipping from the factory, the identical code (a code that indicates null) is stored. When a plug-in program that uses the expansion board 20 is installed from a CD-R, a random value is generated by the data processing system 1, and the board ID 26a is set and stored overwriting the code described above in the flash memory 26.

Next, the board ID 26a is stored on the CD-R, which is the storage medium on which the plug-in program has been stored. The board ID 26a is also stored on the hard disk, on which the plug-in program is installed. Since the board ID 26a can be easily read and used illegally, the ID is encoded and stored in an encoded form. With regard to the encoding method, the board ID 26a is appended to the original data that has been stored on the CD-R and the encoding is performed on data to which the appending has been done, using an encoding key. The encoding method may be a suitable publicly known method.

When the encoded board ID 26a is stored on the CD-R, the authorized flag C, which indicates that the CD-R has already been installed, is written to a specified storage region of the CD-R and, in addition, the CD-R is finalized so that it is not possible to write information to the CD-R. The finalized CD-R is said to be an authorized CD-R.

In those cases where a plug-in program that has been stored on the hard disk 7 is used, first, the board ID 26a is decoded and extracted and whether this is in agreement with the board ID 26a that has been stored in the flash memory 26 is ascertained. If the IDs are in agreement, the regular operation is carried out, but in those cases where the IDs are different, an operation that is different from the regular operation is carried out.

What is meant by an operation that is different from the regular operation is, for example, one in which noise is generated every specified time period. Accordingly, once the board has been authorized by a particular data processing system 1, it is possible to prohibit regular operation with another data processing system 1 because the board ID 26a will be different.

In those cases where the board IDs 26a are not in agreement, rather than a regular operation (hereinafter, referred to as the "authorized mode"), an operation that has been limited (hereinafter, referred to as the "trial mode") is carried out. The sound that is processed by means of the trial mode is imperfect, but since it is known in what way the processing will be done, it is possible to use the trial mode for a so-called trial version or a demonstration.

FIG. 2 is a plane drawing that shows an operating panel of the data processing system 1. The display device 6 is arranged on the upper right of the operating panel and the CD drive 11 is arranged on the lower right. In FIG. 2, a state is shown with the tray in which the CD-R is mounted pulled out a bit.

The six function keys 5a are arranged below the display device 6 along the bottom edge of the display device 6. These function keys 5a select the function that will be displayed in conformance with each of the function keys 5a that are along the bottom edge of the display device 6.

The CD-RW key 5b is arranged below the function keys 5a. When the CD-RW key 5b is pressed, a processing menu regarding the CD-R is displayed on the display device 6 and the desired processing can be selected from within this menu.

For example, processing that installs a program from the CD-R or an uninstall that deletes a program that has been installed.

The effect key 5c is arranged below the CD-RW key 5b. When the effect key 5c is pressed, a processing menu regarding the effects is displayed on the display device 6 and the desired processing can be selected from within this menu. The effect processing will be discussed in detail later while referring to FIG. 3.

Six keys for the instruction of recording and reproduction 5d are arranged below the effect key 5c. The ZERO key is a key that instructs the setting of the position that is recorded or reproduced to the start of the data that it is desired to be reproduced. The REW key is a key that instructs the shifting of the reproduction position toward the direction of the start of the data that it is desired to be reproduced. The FF key is a key that instructs the shifting of the reproduction position toward the end of the data that it is desired to be reproduced.

The STOP key is a key that instructs the interruption of the recording or reproduction when recording or reproduction are being carried out. The PLAY key is a key that instructs the starting of reproduction. The REC key is a key that instructs the starting of recording.

The Yes key and No key 5e are arranged above the keys 5d that instruct recording and reproduction. The Yes key and No key 5e are ones that are operated when a standby display for the instruction of a Yes or a No is carried out. The rotary encoder 5f is arranged above the Yes key and No key 5e and by means of the rotary encoder 5f, it is possible to change the values of the parameters that have been displayed on the display device 6 or to instruct the scrolling of the screen that has-been displayed.

The two master sliders 5g are arranged to the left of the rotary encoder 5f. A plurality of inputs are mixed in the end to the two left and right channels, their levels are adjusted by means of these sliders, and they are recorded. Eight sliders 5h are arranged on the right side of the two master sliders 5g by which the respective input signal levels are adjusted.

The PAN volume controls 5i, the on keys 5j, the select keys 5k, the effect volume controls 5m, and the input jacks 5n are arranged in order toward the top above the eight sliders 5h corresponding to each of the eight sliders 5h.

The PAN volume controls 5i, the on keys 5j, the select keys 5k, and the effect volume controls 5m act on each of the respective sound signals that have been input to the eight input jacks 5n. The PAN volume controls are configured with round volume controls and set the proportions of the inputs that are divided between the respective two left and right channels.

The on keys 5j are switches that set the inputs to on or off. When a switch is set to on, the input is output mixed with the other inputs. When the switch is set to off, the input is not mixed with the other inputs, and is not output.

The select keys 5k are keys that instruct how the settings of the processing and the like of the effects and the like are made for the inputs such that they are displayed on the display device 6. The values of the parameters that have been displayed can be changed using the rotary encoder 5f and the like. The effect volume controls 5m are volume controls that set the depth of the effects.

Figure 3A:
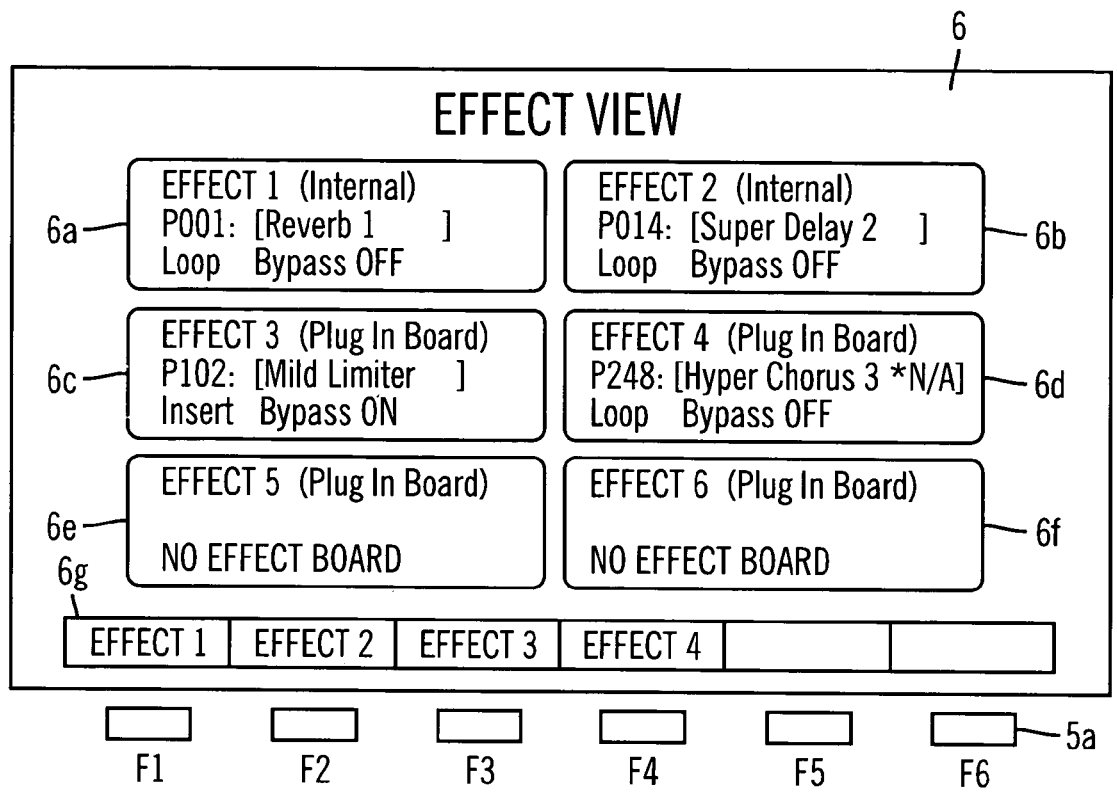

Next, an explanation will be given regarding the setting of the effects. FIG. 3 is a drawing that shows an effect setting screen for the selection of effects that are displayed on the display device 6 when the effect key 5c has been pressed. When the effect key 5c is pressed, first the screen that is shown in FIG. 3(a) is displayed. On this screen, the state in which six effects are set is displayed. Effect 1 (6a) and Effect 2 (6b) are processing that are carried out with the signal processing by the DSP 8 with which the data processing system 1 has been furnished, and both are displayed as "Internal". In Effect 1 (6a), the patch number 1 (Internal) from among the effect patches (the settings with which the type of effect and each of the values of the parameters for that effect are determined) is assigned and the name of that patch is an effect known as Reverb 1. In Effect 2 (6b), an effect known as Super Delay, which is the patch number 14, is set. In a preferred embodiment, the effects that use Internal are assigned the patch numbers from 0 to 99 and the patch numbers from 100 on are assigned to the expansion boards.

Effect 3 (6c), Effect 4 (6d), Effect 5 (6e), and Effect 6 (6f) are shown as the state for the effects that correspond respectively to the four expansion board slots 10. In the cases shown in FIG. 3, for Effect 3 (6c), the effect of number 102, mild limiter, which is a patch that uses an expansion board, is set, and for Effect 4 (6d), the effect hyper chorus, which is the number 248 patch, is set. However, for this Effect 4, "*N/A" (not authorized) is displayed and this indicates that the operation is in the trial mode and not in the authorized mode.

For Effect 5 (6e) and Effect 6 (6f), as is indicated by the display of "No Effect Board", no expansion boards 20 are mounted in the expansion board slots 10 that correspond to these effects.

On the display device 6, the icons 6g that correspond to these six effects are displayed along the bottom area of the display device 6 facing the six function keys 5a. Since for Effect 5 and Effect 6, as discussed above, no expansion boards are mounted, blanks are displayed.

Figure 3B:
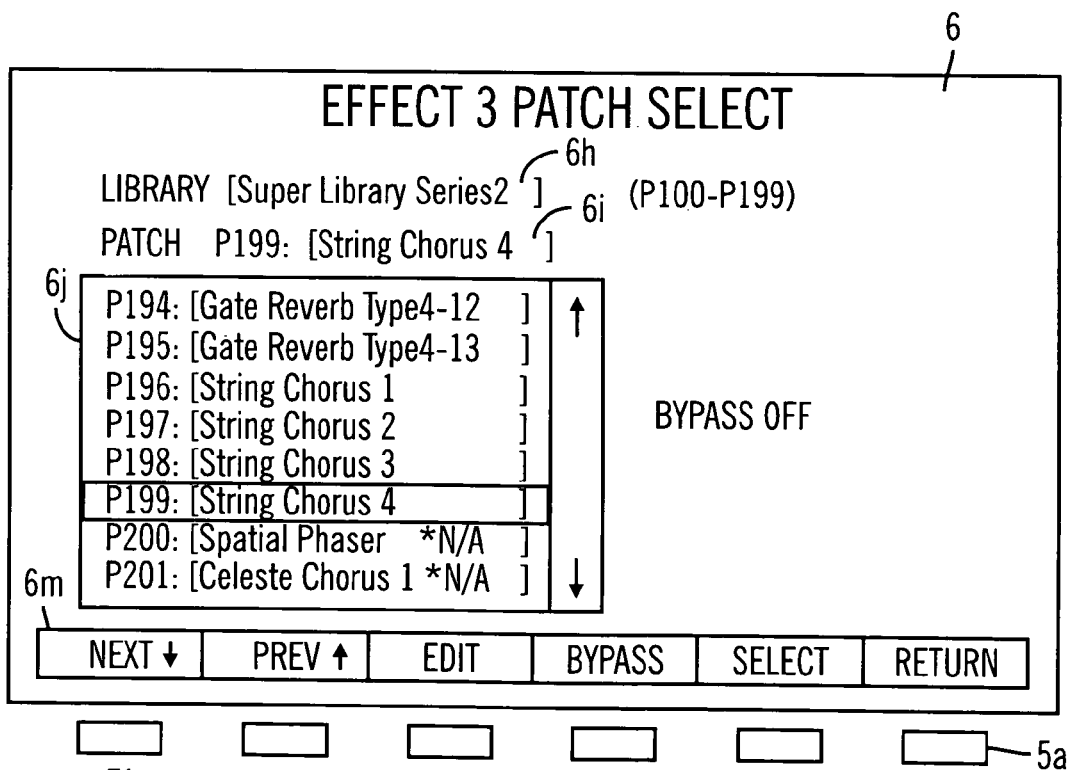

In the display of FIG. 3(a), when the function key F3, which corresponds to Effect 3 (6c), is pressed, as is shown in FIG. 3(b), a screen is displayed with which it is possible to change the assignment of the patch of Effect 3. In FIG. 3(a), for Effect 3 (6c), the patch number 102, mild limiter, is assigned, but in FIG. 3(b), which is the screen in which the assignment is changed, the library 6h (this is a patch group and, here, number 100 through number 199 are made one library) is displayed and, in addition, the patch number and name 6i that are indicated by the cursor are displayed.

In the patch list display screen 6j, the numbers and names of a plurality of patches are displayed and any of the patches can be selected by means of the cursor. The cursor operates the "NEXT" or "PREV" that are displayed by the icons 6m that correspond to the functions keys which are displayed along the bottom area of the display screen 6. Or else, by operating the rotary encoder 5f, it is possible to shift the cursor toward the top or toward the bottom, and when the cursor reaches the top area or the bottom area of the display screen 6j, the patch list is scrolled.

By aligning the cursor with the desired patch and pressing the function key F5 (the key that corresponds to the icon that indicates SELECT), the setting can be carried out. When the function key F3 (Edit) is pressed, the screen for the editing of the parameter values and the like of the patch that is being selected is displayed. When the function key F4 (BYPASS) is pressed, a switching setting for a toggle operation of the On-Off of the path that the effect is output through can be made so that the effect does not pass through. When the function key F6 (RETURN) is pressed, the display of FIG. 3(a), which is one screen before, is switched to.

Figure 4:
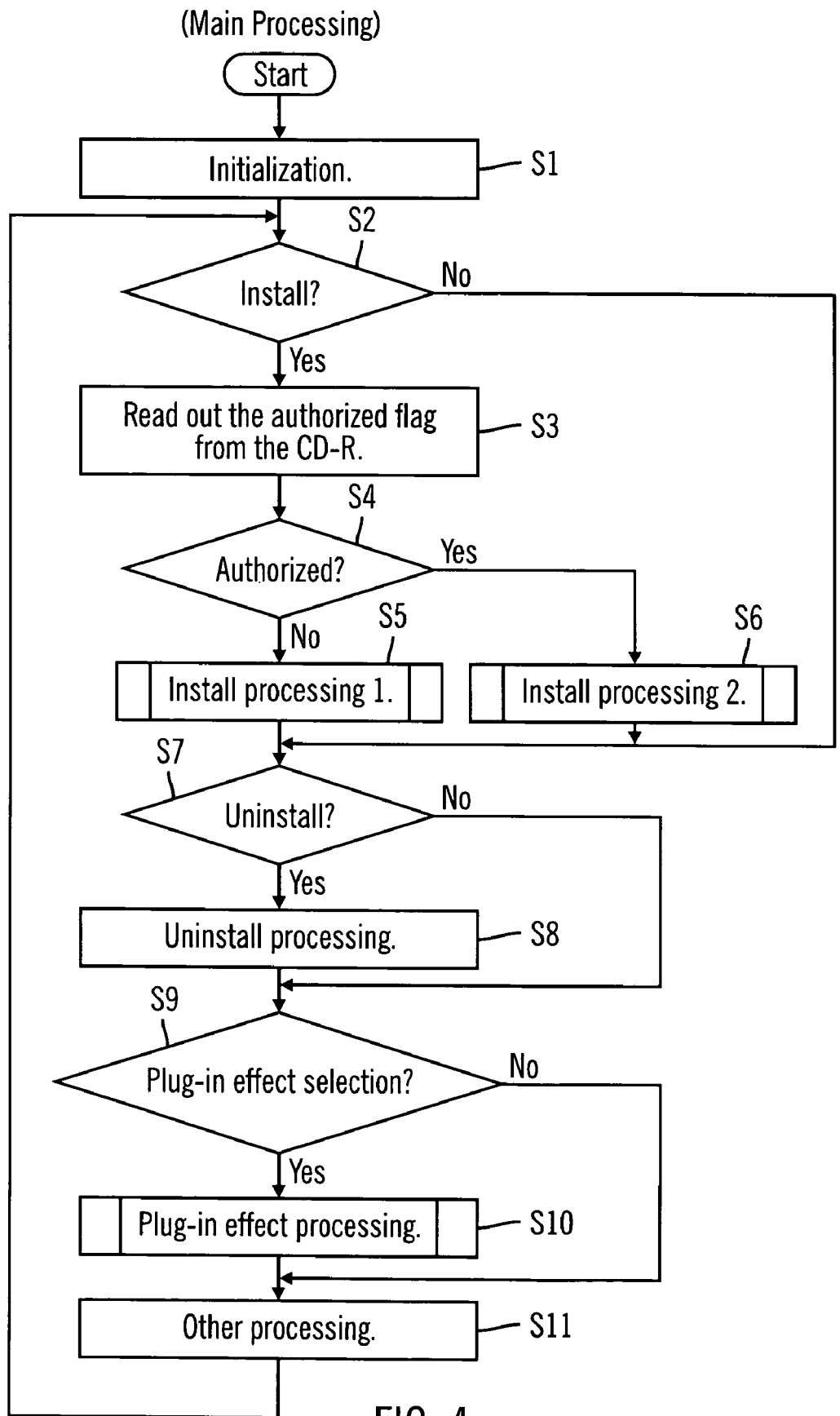
FIG. 4 is a flowchart that shows main processing in accordance with an embodiment of the invention.

Next, an explanation will be given regarding the processing that is executed by the CPU 2 in a data processing system 1 that has been configured as above, while referring to the flowcharts of FIGS. 4-8. FIG. 4 is a flowchart that shows main processing that is launched when the power to the data processing system 1 is turned on and is repeatedly executed until the power is turned off.

First, initialization is executed (S1). For the initialization, processing with which the initial screen is displayed on the display device 6 and the like is executed. Next, a determination is made as to whether the start of the install has been instructed (S2). The instruction of the start of the install is an instruction that is carried out, as discussed above, by pressing the CD-RW key 5b on the operating panel and selecting "Install" from within the menu for the processing that is related to the CD-R, which has been displayed on the display device 6.

In those cases where the start of the install has been selected (S2: yes), the authorized flag C is read out from the CD-R that is mounted (S3) and a determination is made as to whether the CD-R that is mounted is authorized (S4). In those cases where the CD-R has not yet been authorized (S4: no), the install processing 1 is carried out (S5); and in those cases where the CD-R has already been authorized, the install processing 2 is carried out (S6). With regard to the install processing 1 and the install processing 2, these will be discussed later while referring to their respective flowcharts.

In those cases where, in the determination processing of S2, the start of the install has not been instructed (S2: no), or after the completion of the install processing 1 of S5 or the install processing 2 of S6, a determination is made as to whether the start of the uninstall processing has been instructed (S7). The uninstall processing is, in the same manner as the install processing, an instruction that is carried out by pressing the CD-RW key 5b on the operating panel and selecting "Uninstall" from within the menu for the processing that is related to the CD-R, which has been displayed on the display device 6. The uninstall processing is processing that deletes programs or data that have been installed on the hard disk 7 from the hard disk 7 in those cases where the programs or data are not needed or in those cases where the empty region is insufficient.

In those cases where the start of the uninstall processing has been instructed (S7: yes), a list of the programs or data that are installed is displayed on the display device 6, and the programs or data that have been selected from the list are deleted from the hard disk (S8).

In those cases where the uninstall processing has been completed or in those cases where, in the determination processing of S7, the start of the uninstall processing has not been instructed (S7, no), a determination is made as to whether a plug-in effect has been selected (S9). The plug-in effect selection is an instruction that is carried out by pressing the effect key 5c on the operating panel and selecting the type of effect that uses the data that have been installed on the expansion board 20 on the effect setting screen that is shown in FIG. 3.

In those cases where a plug-in effect has been selected (S9: yes), the plug-in effect processing (which will be discussed later) is carried out (S10) and in those cases where a plug-in effect has not been selected (S9: no), other processing is carried out (S11) and the routine returns to the processing of S2. With regard to the other processing, processing such as the detection of the operating state of other switches and the like on the operating panel, and, if a switch and the like is operated, carrying out the processing that corresponds to the operation, is carried out.

Figure 5:
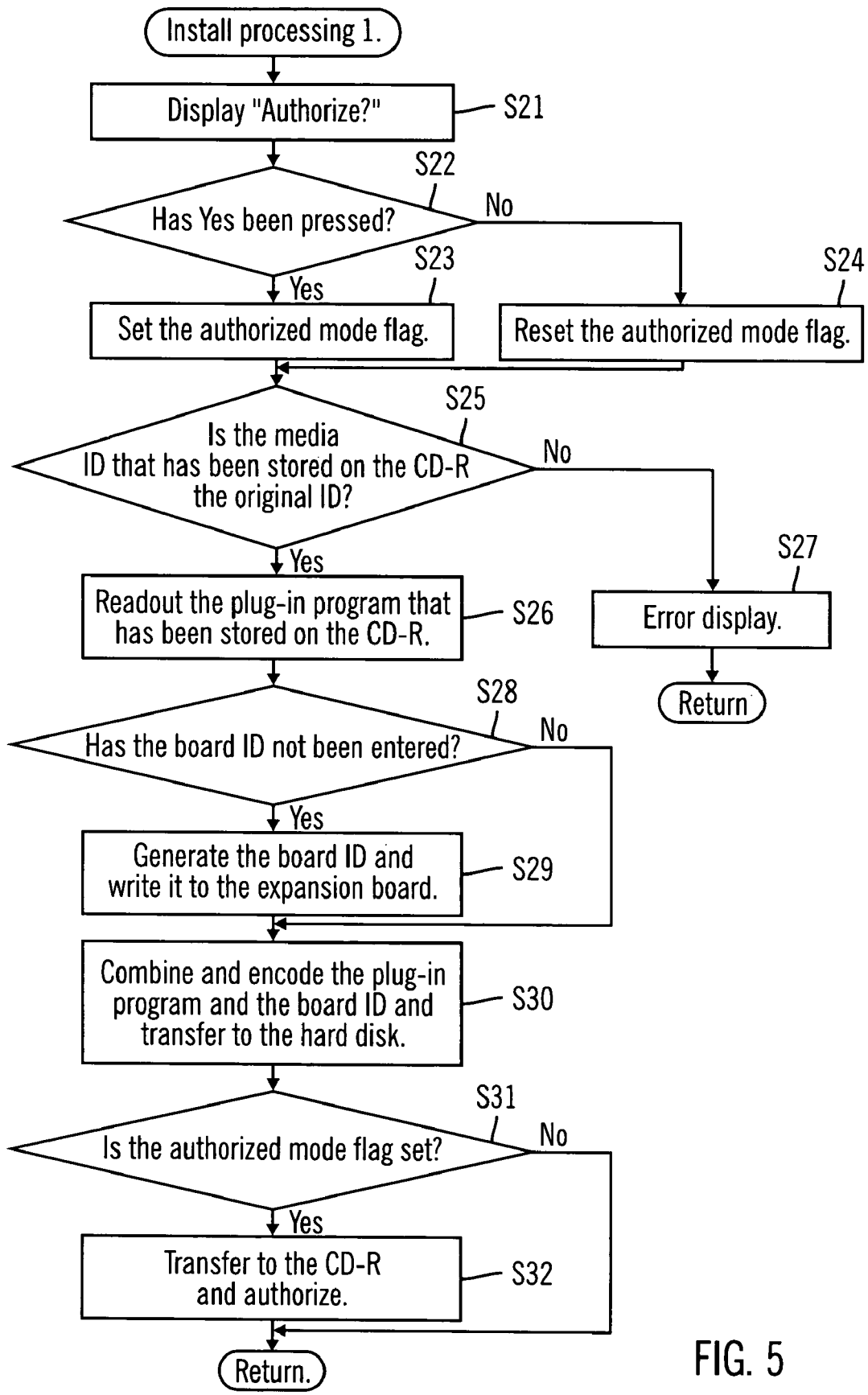
FIG. 5 is a flowchart that shows a first install processing in accordance with an embodiment of the invention.

Next, an explanation will be given regarding the install processing 1 of S5 described above while referring to the flow chart that is shown in FIG. 5. This processing is the install processing for those cases where the CD-R has not yet been authorized.

First "Authorize?" is displayed on the display device 6 (S21). This display is a display that asks the user whether the CD-R should be authorized or should not be authorized. In those cases where the user has selected to authorize for this query, the data that are stored on the CD-R are installed on the hard disk 7 and, together with this, the CD-R is authorized. In other words, the authorized flag C is set and finalized on the CD-R. This state is called the authorized mode and a regular operation is carried out in accordance with the data that have been installed.

On the other hand, in those cases where to not authorize has been selected, the data that are stored on the CD-R are installed on the hard disk 7 and the CD-R is not authorized. This state is called the trial mode and a limited operation is carried out in accordance with the data that have been installed. The trial mode is used in the store and the like in order to know the essentials of the plug-in program that has been stored on the CD-R.

In those cases where the user has pressed the Yes key 5e for the display of "Authorize?" (S22: yes), the authorized flag H is set (S23); and, in those cases where the user has pressed the No key 5e (S22: no), the authorized flag H is reset (S24). The authorized flag H is a flag that is stored on the hard disk 7 and is distinct from the authorized flag C that is stored on the CD-R.

Next, the media ID that is stored on the CD-R is read out and a determination is made as to whether the media ID is in agreement with the media ID 3a (the original ID) that is stored in the ROM 3 (S25). In those cases where they are not in agreement (S25: no), since the CD-R is regarded as one that has been copied illegally, an error display is made on the display device 6 (S27), the install processing 1 ends, and the routine returns to the main processing.

In those cases where the media ID that is stored on the CD-R is in agreement with the original ID that is stored in the ROM 3 (S25: yes), the CD-R is not regarded as one that has been copied illegally and the programs and data that are stored on the CD-R (hereinafter, referred to as the "plug-in program") are read out (S26).

Next, the board ID 26a that is stored in the flash memory 26 of the expansion board 20 that is mounted in a specified slot (for example, the first slot) from among the four of the expansion board slots 10 is acquired. In detail, a request for the transmission of the board ID 26a is made by the CPU 2 of the data processing system 1 to the CPU 21 of the expansion board 20 via the interface 25 and the CPU 21 of the expansion board 20 transmits the board ID 26a that is stored in the flash memory 26 to the CPU 2 via the interface 25. The CPU 2 makes a determination as to whether the board ID 26a that has been transmitted is a null (S28).

In those cases where the board ID 26a that has been transmitted is a null (S28: yes), a random value is generated based on a figure such as the time and the like, that value is transferred to CPU 21 of the expansion board 20 via the interface 25 as the board ID 26a, and the CPU 21 writes that board ID 26a to the flash memory 26 (S29). By this means, since an N code (null) that indicates a null is written uniformly to the expansion boards 20 that are produced at the factory, it is possible to reduce the costs related to manufacturing.

In those cases where, in the determination processing of S28, the board ID 26a has already been stored (S28: no), that board ID 26a is acquired and the board ID 26a is appended to the plug-in program (combined), encoded by means of an operation with a specified key and transferred to the hard disk 7 and, together with this, is registered in the table that manages the programs and data that have been installed on the hard disk 7 (S30).

In this manner, the plug-in program is installed on the hard disk 7. Next, a determination is made as to whether the authorized flag H is set (S31), and if the flag is set (S31: yes), the encoded board ID 26*a* and plug-in are transferred to the CD-R also, the authorized flag is set on the CD-R, and finalization processing is carried out so that it is not possible to write further information to the CD-R (S32).

In those cases where, in the determination processing of S31, the authorized flag H has not been set (S31: no), the install processing 1 is ended without carrying out the processing of the CD-R and the routine returns to the main processing.

In those cases where the user has selected authorize in the install processing 1, in the above manner, the encoded board ID 26*a* and plug-in program are written to the CD-R, the encoded board ID 26*a* and plug-in program are written to the hard disk 7 and, together with this, the authorized flag H is set.

On the other hand, in those cases where the user has not selected authorize, nothing is written to the CD-R, the encoded ID 26*a* and the plug-in program are written to the hard disk 7 and, together with this, the authorized flag H is reset.

Next, an explanation will given regarding the install processing 2, which is the processing of S6 of the flowchart that is shown in FIG. 4. This processing is one in which the CD-R has already been authorized. This is for cases such as those in which after authorize has been done, the hard disk is exchanged, or so that the plug-in program can be uninstalled and reinstalled, and those cases in which it is made possible to do testing with an authorized CD-R.

Figure 6:
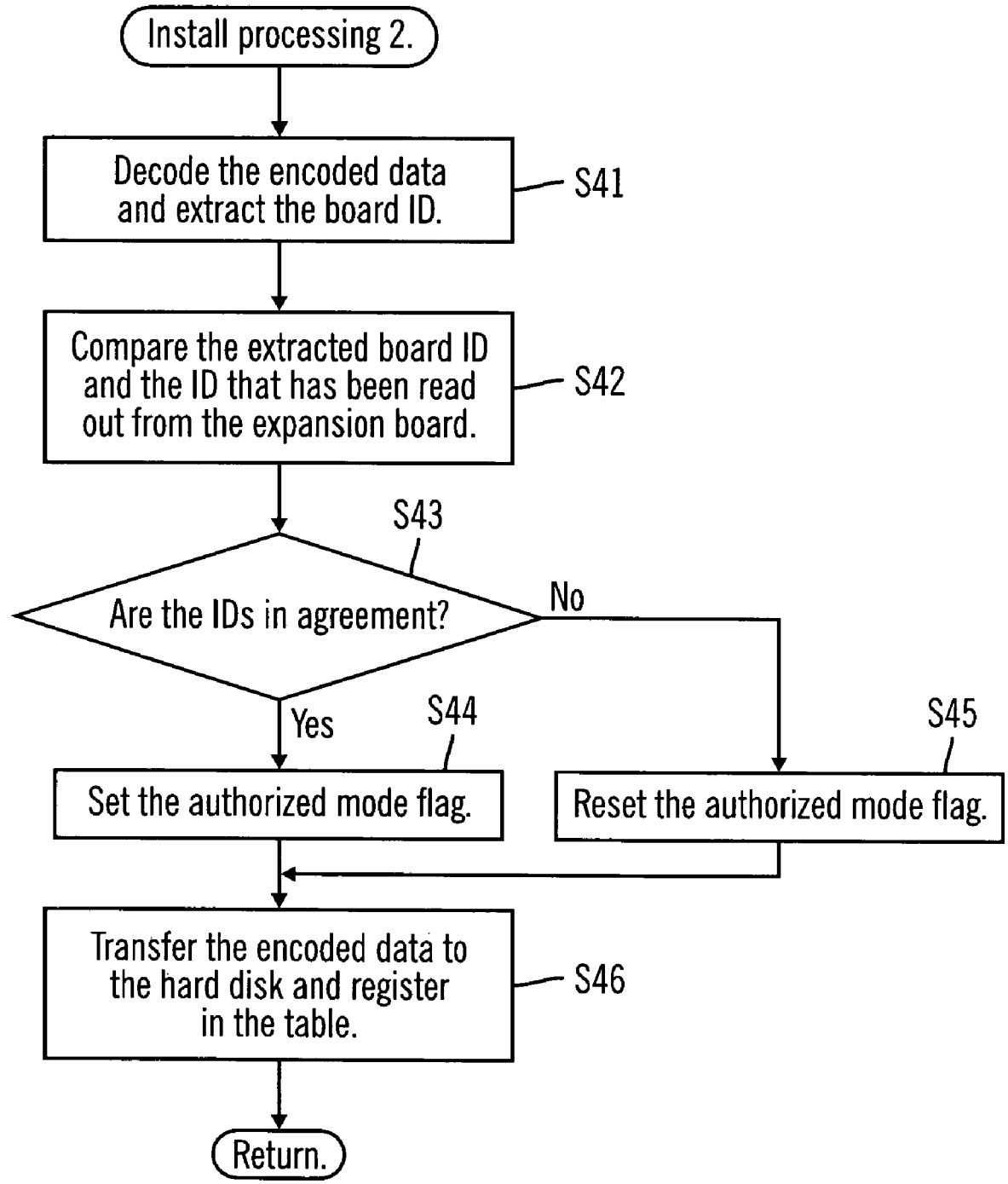
FIG. 6 is a flowchart that shows a second install processing in accordance with an embodiment of the invention.

FIG. 6 is a flowchart that shows the install processing 2. First, the board ID 26*a* and the plug-in program that have been encoded are decoded and the board ID 26*a* is extracted (S41). Next, the board ID 26*a* that has been stored in the flash memory 26 of the expansion board 20 is acquired and compared with the board ID that has been acquired from the CD-R (S42). In this case also, the transmission of the board ID 26*a* is requested from the CPU 21 of the expansion board by the CPU 2 of the data processing system 1 via the interface 25, and the CPU 21 of the expansion board 20 transmits the board ID 26*a* that is stored in the flash memory 26 via the interface 25 to the CPU 2, which thus acquires the board ID 26*a*. Since it is possible to mount four expansion boards 20 in the expansion board slots 10, as described above, the board IDs 26*a* of all of the expansion boards 20 that are mounted are acquired and compared in order.

In those cases where the board ID 26*a* that has been acquired from the CD-R is in agreement with any of the expansion board IDs 26*a* (S43: yes), the authorized flag H is set (S44), and in those cases where the board ID 26*a* that has been acquired from the CD-R is not in agreement with any of the expansion board IDs 26*a* (S43: no), the authorized flag H is reset (S45). Following the processing of S44 or the processing of S45, the encoded board ID 26*a* and plug-in program are transferred to the hard disk 7 and registered in the table that manages the programs and data that have been installed on the hard disk 7 (S46), the install processing 2 is ended, and the routine returns to the main processing.

In those cases where, as described above, a CD-R that has already been authorized is used and the board ID 26*a* of the CD-R and the board ID 26*a* of the data processing system are in agreement, the authorized flag H is set and the plug-in program is reinstalled. In those cases where the board ID 26*a* of the CD-R and the board ID 26*a* of the data processing system are not in agreement, the authorized flag H is reset and the plug-in program is installed.

Figure 7:
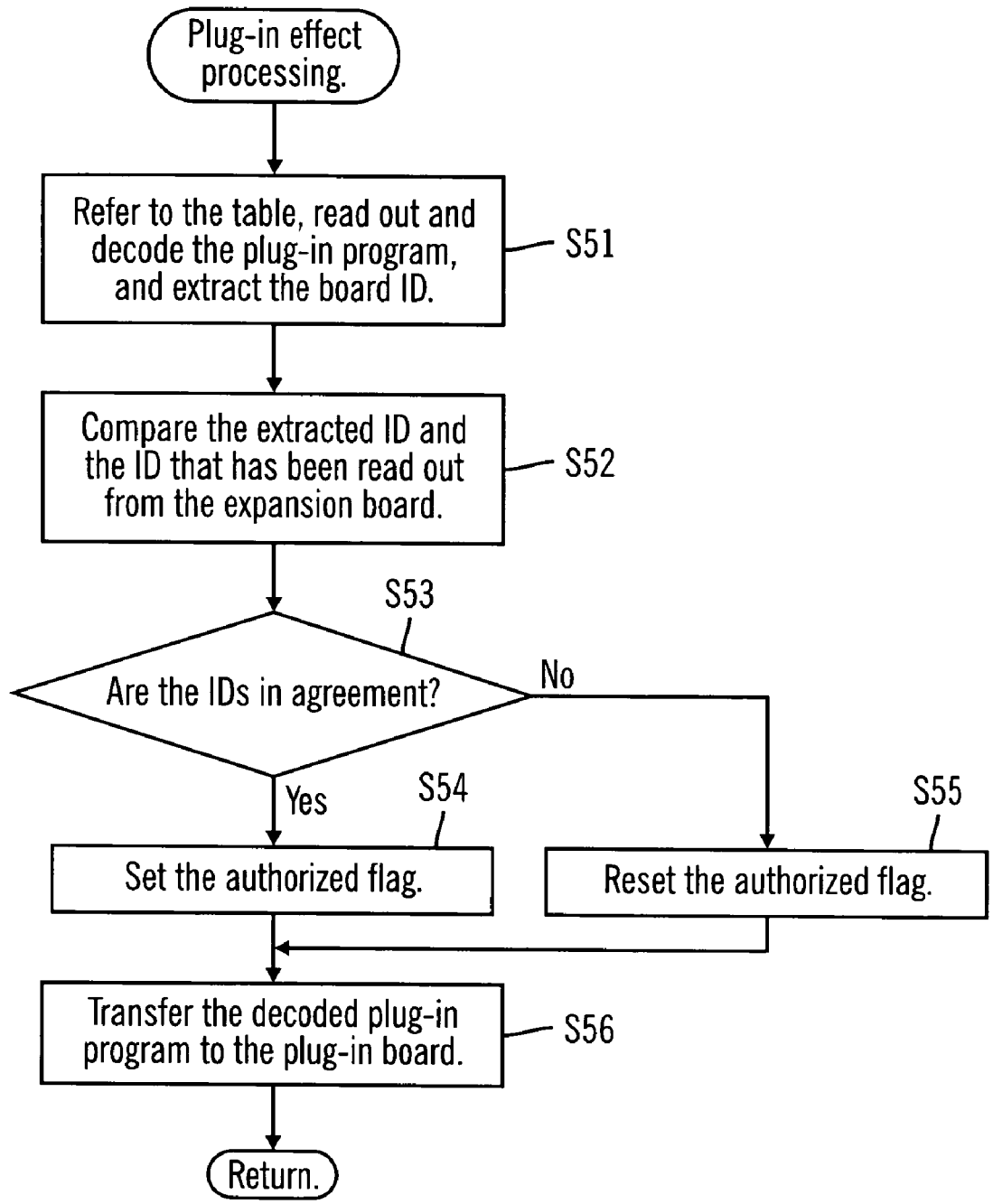
FIG. 7 is a flowchart that shows plug-in effect processing in accordance with an embodiment of the invention.

Next, an explanation will be given, while referring to the flowchart of FIG. 7, regarding plug-in effect processing which is the processing of S10 of the flowchart that is shown in FIG. 4. This processing is, as discussed above, processing that is carried out when the effect key 5*c* on the operating panel is pressed and the type of effect that uses the data that has been installed on the expansion board 20 is selected from the effect setting screen that is shown in FIG. 3.

First, the data that are included in the type of effect that has been selected are read out referring to the table that is stored on the hard disk 7, the encoded board ID 26*a* and plug-in program are decoded, and the board ID 26*a* is extracted (S51). Next, the board ID 26*a* that has been extracted and the board ID 26*a* of the expansion board 20 are compared (S52). With regard to the method for the acquisition of the board ID 26*a* and the comparison method, since these are identical to the processing of S42 of the flowchart shown in FIG. 6, their explanations will be omitted.

In those cases where the board ID 26*a* that has been extracted and the board ID 26*a* of the expansion board are in agreement (S53: yes), the authorized flag H is set (S54) and, in those cases where the board ID 26*a* that has been extracted and the board ID 26*a* of the expansion board are not in agreement (S53: no), the authorized flag H is reset (S55). Next, the plug-in program that has been decoded is transferred to the expansion board 20 (S56), the plug-in effect processing is ended, and the routine returns to the main processing.

As described above, at the time that the plug-in program that has been installed on the hard disk 7 is executed, the program is decoded and the board ID 26*a* is extracted. If the board ID 26*a* that has been extracted and the board ID 26*a* of the expansion board that is mounted in the expansion board slot 10 are in agreement, the authorized flag H is set, and if not in agreement, the authorized flag H is reset and the plug-in program is transferred to the expansion board 20.

Figure 8:
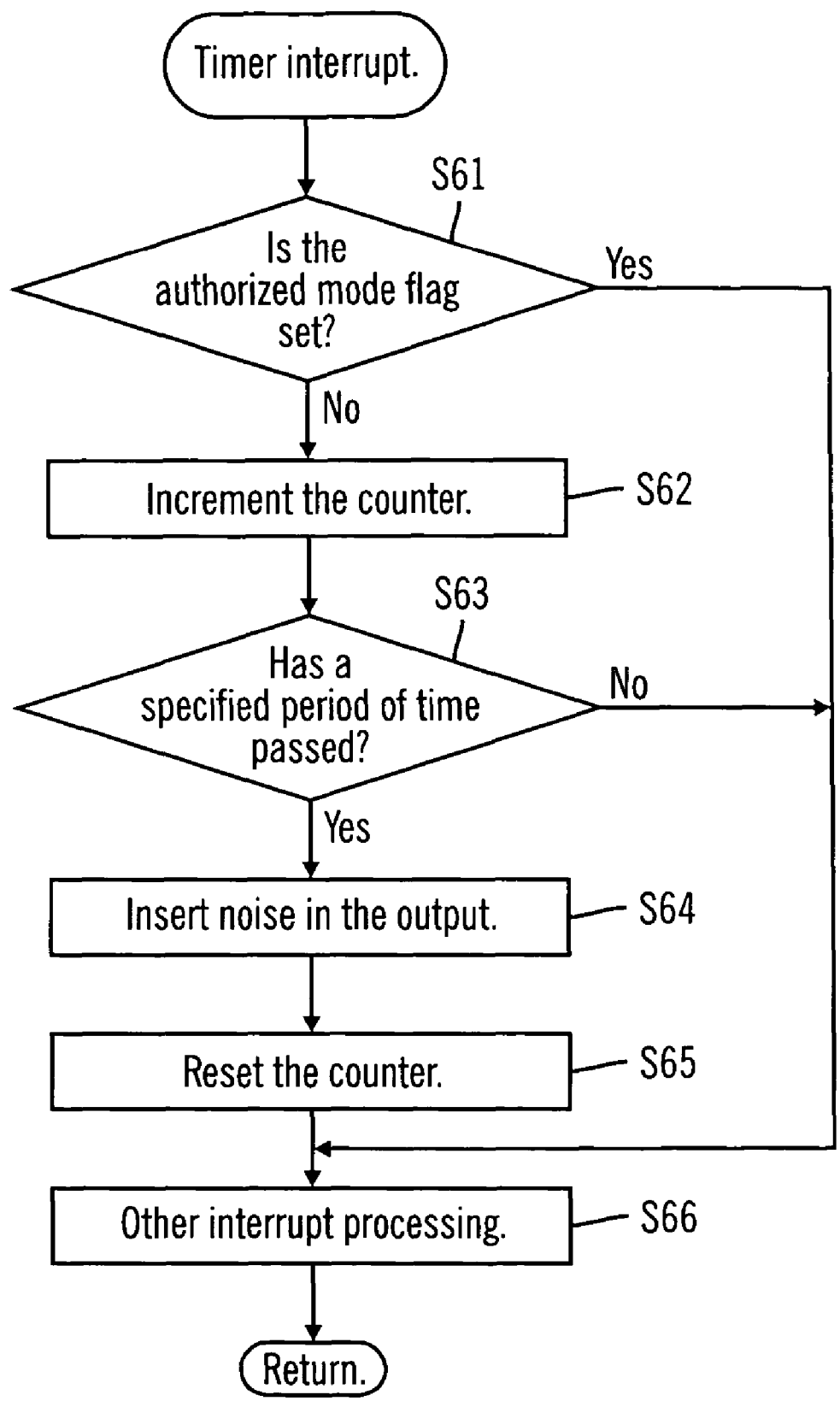
FIG. 8 is a flowchart that shows interrupt processing in accordance with an embodiment of the invention.

Next, an explanation will be given regarding sound processing in those cases where the authorized flag H is set and in those cases where the authorized flag H is reset while referring to the flowchart shown in FIG. 8. This sound processing is processing that is executed by the CPU 2 and is processing that is launched every 1 msec by a timer interrupt that is set in the initialization setting of S1 of the flowchart shown in FIG. 4.

First, a determination is made as to whether the authorized flag H is set (S61). In those cases where the authorized flag H is not set (S61: no), the counter that is stored in the RAM 4 is incremented (S62). This counter is for timing a specified time period and is set to 0 at the time of the initialization. Next, a determination is made as to whether the counter value is a specified value or greater; in other words, if a specified period of time has passed since the time that counter value was previously made 0 (S63). In those cases where a specified period of time has passed (S63: yes), an instruction is issued to the DSP 8 to insert noise into the sound (S64), and the counter value is reset (set to 0) (S65).

In those cases where, in the determination processing of S61, the authorized flag H is set, or in those cases where, in the determination processing of S63, a specified period of time has not passed, or in those cases where the counter has been reset in the processing of S65, next, other interrupt processing is carried out (S66), the processing is ended, and the routine returns to the main processing. With regard to the other interrupt processing, there are those such as processing to detect the state of the switches with which the operating panel is furnished.

In accordance with the interrupt processing as described above, in those cases where the authorized flag H is set (the authorized mode), noise is not inserted into the sound, but in those cases where the authorized flag H is reset (trial mode), noise is periodically inserted into the sound.

As other embodiments in which the processing in the authorized mode and the processing in the trial mode are different, there are the following: (1) It is set up such that the sound is periodically muted (the volume is set to 0) in the trial mode and is not muted in the authorized mode; (2) It is set up such that the frequency characteristics of the sound are periodically changed in the trial mode and are not changed in the authorized mode; and (3) It is set up such that the parameters of the effects can be set by the user and those parameters can be stored in the authorized mode but, in the trial mode, the user can set the parameters of the effects, but the parameters cannot be stored.

As has been explained above, in those cases where a CD-R on which a plug-in program has been stored is mounted in the data processing system 1 and the authorized mode has been selected, the board ID 26a is appended to the plug-in program and encoded and written to the CD-R and, together with this, installed on the hard disk 7. Accordingly, even if the program is installed by a CD-R that has been authorized in a data processing system 1 in which an expansion board having another board ID 26a that is different is mounted, the processing will be carried out in the trial mode and not in the authorized mode. Therefore, it is possible to prevent illegal use and, together with this, the plug-in program can be tried out with restrictions.

In addition, since the board ID 26a is also appended to the plug-in program that has been installed on the hard disk 7, even if the plug-in program of the hard disk 7 is copied to another data processing system 1, since the processing will not be done in the authorized mode if the board ID 26a is different, it is possible to prevent the program from being used illegally.

In addition, even with another data processing system 1, if an authorized CD-R and its authorized expansion board 20 are used, it is possible for the plug-in program to be installed and used in the authorized mode.

An example of a storage medium writing means is shown at the processing of S32 of the flowchart shown in FIG. 5. An example of a first determination means is shown at the processing of S53 of the flowchart shown in FIG. 7. In addition, an example of a second determination means is shown at the processing of S25 of the flowchart of FIG. 5. In addition, an example of an encoding means is shown at the processing of S30 of the flowchart shown in FIG. 5. An example of a decoding means is shown at the processing of S41 of the flowchart shown in FIG. 6.

An explanation was given above of the present invention based on embodiments. However, the present invention is in no way limited to the embodiments described above and the fact that various modifications and changes are possible that do not deviate from and are within the scope of the essentials of the present invention can be easily surmised.

For example, in the embodiments described above, the flash memory in which the device ID is stored is furnished on an expansion board 20 and identifies the expansion board, but it may also be set up with the flash memory connected directly to the bus of the data processing system 1 and an ID that identifies the data processing system.

In addition, in the embodiments described above, it is illustrated with the sound processing carried out by the data processing system 1 as information processing but it may also be set up as a data processing system that does the processing of the image data and all other data.

In addition, in the embodiments described above, it is set up with the CD drive 11 built into the data processing system 1, but it may set up with the data processing system 1 furnished with a connector to which the CD drive 1 is connected and connectable to the CD drive 1.

In addition, in the embodiments described above, it is set up with the data supplied by means of a CD-R or a CD-RW, but it may also be done with other storage media on which an ID that cannot be changed can be stored.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A data processing system, comprising:
    readout means for reading out data that have been stored on a storage medium that is removably mounted in an external storage means;
    device ID storage means for storing a device ID that is peculiar to a device and for storing the data that have been read out by the readout means;
    storage medium writing means for writing the device ID that has been stored in the device ID storage means to the storage medium;
    first determination means for making a determination as to whether a particular device ID stored in a particular device and the device ID that has been stored in the device ID storage means are in agreement, said particular device separate and distinct from said storage medium; and
    processing means for causing the particular device to carry out first processing that is based on the data that have been read out by the readout means in a case where it has been determined by the first determination means that the particular device ID and the device ID are in agreement, and for causing second processing, which differs from the first processing, to be carried out in a case where it has been determined by the first determination means that the particular device ID and the device ID are not in agreement.

2. The data processing system of claim 1,
    wherein the storage medium is one that stores a media ID that specifies the storage medium and which it is not possible to copy;
    wherein the data processing system further comprises:
        media ID storage means for storing a particular media ID; and
        second determination means for making a determination as to whether the particular media ID that is stored by the media ID storage means and the media ID that is stored on the storage medium are in agreement; and
    wherein the readout means reads out the data that have been stored in the storage medium in those cases where it has been determined by the second determination means that the particular media ID and the media ID are in agreement, and the readout means is prevented from reading out the data that have been stored in the storage medium in those cases where it has been determined by the second determination means that the particular media ID and the media ID are not in agreement.

3. The data processing system of claim 1, further comprising:
encoding means for encoding the device ID when the device ID is stored in the device ID storage means; and
decoding means for decoding the device ID that has been encoded by the encoding means;
wherein the storage medium writing means is one in which the device ID that has been encoded by the encoding means is written to the storage medium; and
wherein the first determination means is one in which a determination is made as to whether a specific device ID that has been written to a specific storage medium, which has been decoded by the decoding means, and the device ID that has been stored in the device ID storage means are in agreement.

4. The data processing system of claim 1,
said particular device comprising an expansion board that comprises data processing means for performing processing based on the data that have been read out from the storage medium by the readout means; and
said data processing system further comprising:
mountable expansion board mounting means in which the expansion board is free to be mounted and removed.

5. The data processing system of claim 4,
wherein the data processing means comprises musical tone processing means that processes a musical tone signal, and musical tone processing is carried out by the musical tone processing means based on the data that have been read out by the readout means.

6. The data processing system of claim 1,
wherein the device ID storage means comprises a non-volatile writable memory; and
wherein the data processing system further comprises:
device ID generation means for generating the device ID; and
device ID writing means for writing the device ID that has been generated by the device ID generation means to the device ID storage means.

7. The data processing system of claim 1,
wherein the particular device comprises musical tone processing means for processing a musical tone signal; and
wherein, in those cases where a determination has been made by the first determination means that the particular device ID and the device ID are in agreement, the processing means causes the musical tone processing means to carry out first musical tone processing based on the data that have been read out by the readout means, and in those cases where a determination has been made by the first determination means that the particular device ID and the device ID are not in agreement, the processing means causes the musical tone processing means to carry out second musical tone processing, which is different from the first musical tone processing.

8. The data processing system of claim 1,
said second processing including imparting an effect to a sound signal.

9. The data processing system of claim 8, further comprising:
encoding means for encoding the particular device ID when the particular device ID is stored in the device ID storage means; and
decoding means for decoding the particular device ID that has been encoded by the encoding means;
wherein the first determination means is one in which a determination is made as to whether the particular device ID that has been stored in encoded form in the device ID storage means, which has been decoded by the decoding means, and a device ID that has been stored in a processing information storage means are in agreement.

10. The data processing system of claim 8,
wherein the processing means comprises musical tone processing means that processes a musical tone signal, and musical tone processing is carried out by the musical tone processing means based on the data that have been stored in a processing information storage means.

11. The data processing system of claim 8,
wherein the device ID storage means comprises a non-volatile writable memory; and
wherein the data processing system further comprises:
device ID generation means for generating the particular device ID; and
device ID writing means for writing the particular device ID that has been generated by the device ID generation means to the device ID storage means.

12. The data processing system of claim 8,
wherein the processing means comprises musical tone processing means that processes a musical tone signal, and in those cases where a determination has been made by the first determination means that the device ID and the particular device ID are in agreement, first musical tone processing is carried out by the musical tone processing means based on the data that have been stored in a processing information storage means, and in those cases where a determination has been made by the first determination means that the device ID and the particular device ID are not in agreement, second musical tone processing, which is different from the first musical tone processing, is carried out by the musical tone processing means.

13. The data processing system of claim 1,
the device ID storage means comprising an expansion board and a slot for mounting the expansion board, the expansion board having an expansion board storage element for storing the particular device ID; and
said second processing including imparting an effect to a sound signal.

14. The data processing system of claim 13,
wherein the storage medium comprises a hard disk drive.

15. The data processing system of claim 13,
wherein the processing means comprises a central processing unit (CPU), a read-only memory (ROM), a random access memory (RAM), and a digital signal processor (DSP).

16. The data processing system of claim 13,
wherein the device ID and the particular device ID are in agreement when the device ID is the same as the particular device ID.

17. The data processing system of claim 13,
wherein the data comprises a program; and
wherein, in the event that the device ID and the particular device ID are in agreement, the processing means causes the expansion board to execute the program.

18. The data processing system of claim 17,
wherein, in the event that the device ID and the particular device ID are not in agreement, the processing means causes the expansion board to execute the program and causes an output of the program to be changed during a time period.

19. The data processing system of claim 17,
wherein the program comprises a program for imparting the effect to the sound signal; and
wherein, in the event that the device ID and the particular device ID are not in agreement, the processing means causes the expansion board to execute the program and performs at least one of inserting noise into an output sound signal of the program, periodically muting the output sound signal, and changing frequency characteristics of the output sound signal.

20. The data processing system of claim 13,
wherein, in the event that the device ID and the particular device ID are in agreement, the processing means causes the first processing to be carried out by transferring the data to the expansion board and setting an authorized flag; and
wherein, in the event that the device ID and the particular device ID are not in agreement, the processing means causes the second processing to be carried out by transferring the data to the expansion board and resetting the authorized flag.

21. The data processing system of claim 13,
said processor means configured to cause the first processing to be carried out on the expansion board in the event that the device ID and the particular device ID are in agreement.

22. The data processing system of claim 13,
said second processing including imparting the effect to the sound signal and periodically distorting a sound output from the data processing system.

23. The data processing system of claim 1,
said first processing including imparting an effect to a sound signal.

24. The data processing system of claim 1,
said first processing providing for processing image data.

25. The data processing system of claim 1,
said second processing including imparting an effect to a sound signal.

26. The data processing system of claim 1,
said storage medium comprising a non-volatile memory.

27. The data processing system of claim 1,
said storage medium comprising a compact disc (CD).

28. The data processing system of claim 1,
wherein the particular device is the device.

29. The data processing system of claim 1,
wherein the particular device is different from the device.

30. A method for providing copy protection for first data stored on a storage medium for use with a data processing system, the data processing system having a storage element for storing data, a storage medium device for reading data from the storage medium and writing data to the storage medium, and an expansion board slot for receiving expansion boards, the method comprising:
installing the first data from the storage medium to the storage element of the data processing system;
determining a board ID of an expansion board that is inserted in the expansion board slot of the data processing system when the first data is installed from the storage medium to the storage element of the data processing system, said storage medium separate and distinct from said expansion board;
writing the board ID to the storage medium;
storing the board ID in the storage element of the data processing system;
determining, upon receiving a request to execute processing based on the first data, a particular board ID of a particular expansion board that is inserted in the expansion board slot of the data processing system at the time of receiving the request;
determining whether the particular board ID and the board ID stored in the storage element of the data processing system are in agreement;
performing, in an event that the particular board ID and the board ID are determined to be in agreement, first processing based on the first data; and
performing, in an event that the particular board ID and the board ID are determined to not be in agreement, second processing that is different from the first processing.

31. The method of claim 30,
wherein the first data comprises a program;
wherein said performing, in the event that the particular board ID and the board ID are determined to be in agreement, first processing based on the first data, comprises:
performing, in the event that the particular board ID and the board ID are determined to be in agreement, first processing by executing the program; and
wherein said performing, in the event that the particular board ID and the first board ID are determined to not be in agreement, second processing that is different from the first processing, comprises:
performing, in the event that the particular board ID and the board ID are determined to not be in agreement, second processing by executing the program and changing an output of the program during a time period.

32. The method of claim 30,
wherein the first data comprises a program for producing an output sound signal;
wherein said performing, in the event that the particular board ID and the board ID are determined to be in agreement, first processing based on the first data, comprises:
performing, in the event that the particular board ID and the board ID are determined to be in agreement, first processing by executing the program; and
wherein said performing, in the event that the particular board ID and the board ID are determined to not be in agreement, second processing that is different from the first processing, comprises:
performing, in the event that the particular board ID and the board ID are determined to not be in agreement, second processing by executing the program and by performing at least one of inserting noise into the output sound signal of the program, periodically muting the output sound signal of the program, and changing frequency characteristics of the output sound signal of the program.

33. The method of claim 30,
wherein the particular expansion board is the expansion board.

34. The method of claim 30,
wherein the particular expansion board is different from the expansion board.

35. The method of claim 30,
said storage medium comprising a compact disc (CD).

36. The method of claim 30, said first data comprising a program, said method further comprising:
transferring the program from the storage element of the data processing system to the particular expansion board.

37. The method of claim 36, wherein said performing, in the event that the particular board ID and the board ID are determined to be in agreement, first processing based on the first data, comprises:

executing, by the particular expansion board, the program in the event that the particular board ID and the board ID are determined to be in agreement.

38. The method of claim 36, wherein said performing, in the event that the particular board ID and the board ID are determined to not be in agreement, second processing that is different from the first processing, comprises:

executing, by the particular expansion board, the program in the event that the particular board ID and the board ID are determined to not be in agreement; and interrupting said executing at a time point to change an output of the program.

39. The method of claim 30, said second processing providing for performing processing on at least one sound signal.

40. The method of claim 30, said first processing comprising imparting an effect to at least one sound signal.

41. The method of claim 30, said second processing comprising imparting an effect to at least one sound signal.

42. The method of claim 30, said first processing and said second processing comprising processing image data.

\* \* \* \* \*